(No Model.) 7 Sheets—Sheet 1.

C. ERLANGER.
BUTTON FASTENING MACHINE.

No. 325,516. Patented Sept. 1, 1885.

Attest:
W. H. N. Knight
Saml. B. H. Jacobson

Inventor:
Charles Erlanger
by Abraham and Mayer
attorneys (No Model.)

7 Sheets—Sheet 2.

C. ERLANGER.
BUTTON FASTENING MACHINE.

No. 325,516. Patented Sept. 1, 1885.

Attest:
W. H. H. Knight
Saml. H. Jacobson

Inventor
Charles Erlanger
by Abraham and Mayer
attorneys (No Model.)  7 Sheets—Sheet 3.

C. ERLANGER.
BUTTON FASTENING MACHINE.

No. 325,516.  Patented Sept. 1, 1885.

Attest: W. H. Knight, Saml. H. Jacobson

Inventor: Charles Erlanger
by Abraham and Mayer
Attorneys (No Model.)     7 Sheets—Sheet 4.

C. ERLANGER.
BUTTON FASTENING MACHINE.

No. 325,516.     Patented Sept. 1, 1885.

Attest:
C. W. H. Knight
Saml. H. Jacobson

Inventor:
Charles Erlanger
by Abraham and Mayer
attorneys

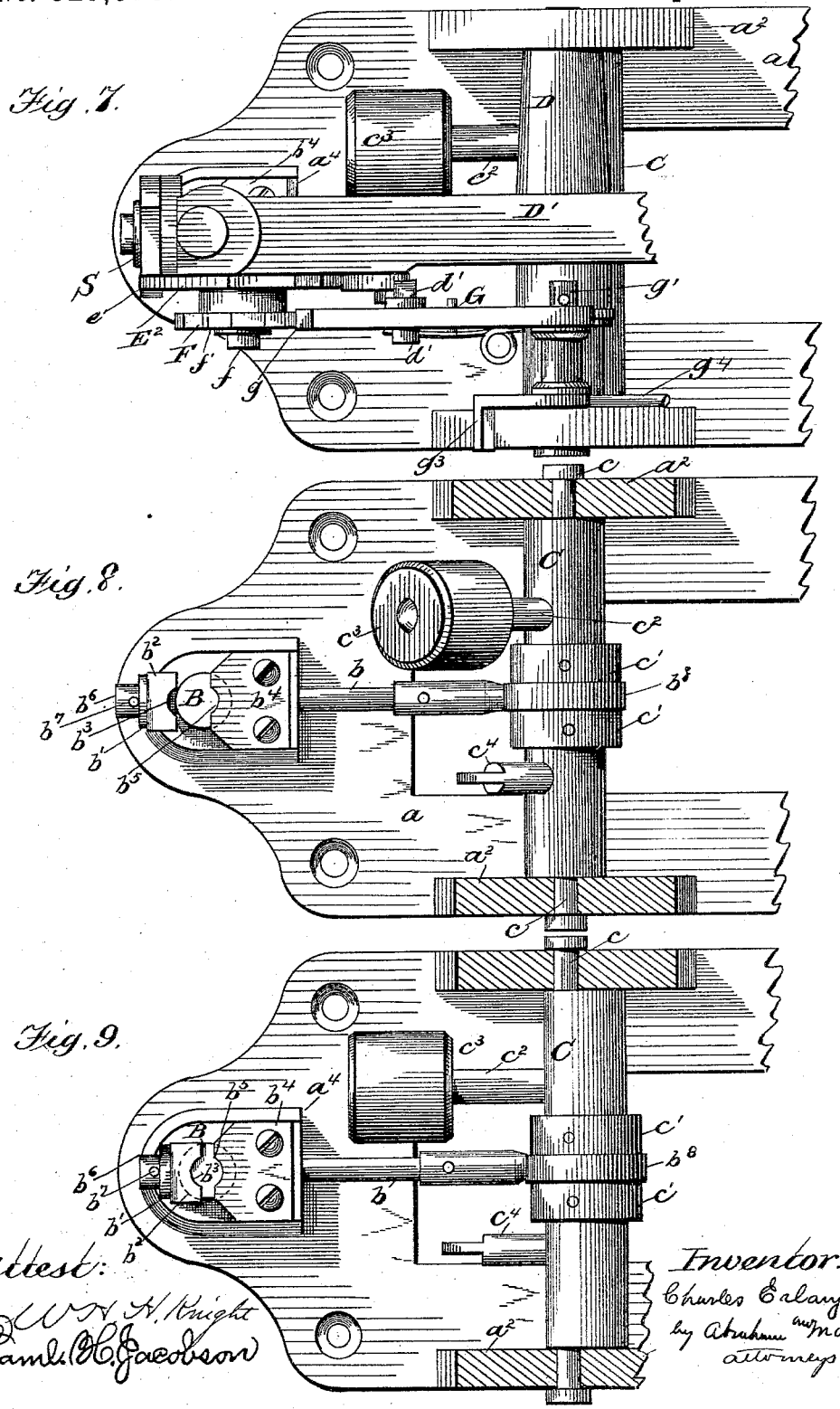

(No Model.) 7 Sheets—Sheet 6.
C. ERLANGER.
BUTTON FASTENING MACHINE.
No. 325,516. Patented Sept. 1, 1885.
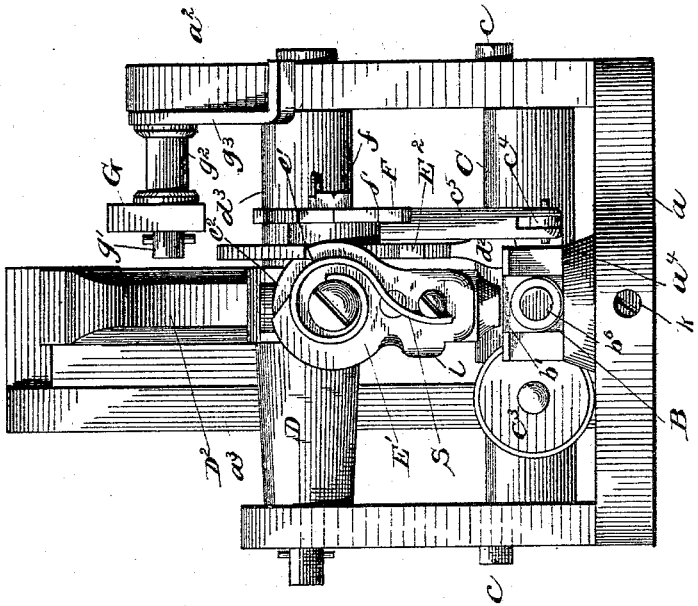
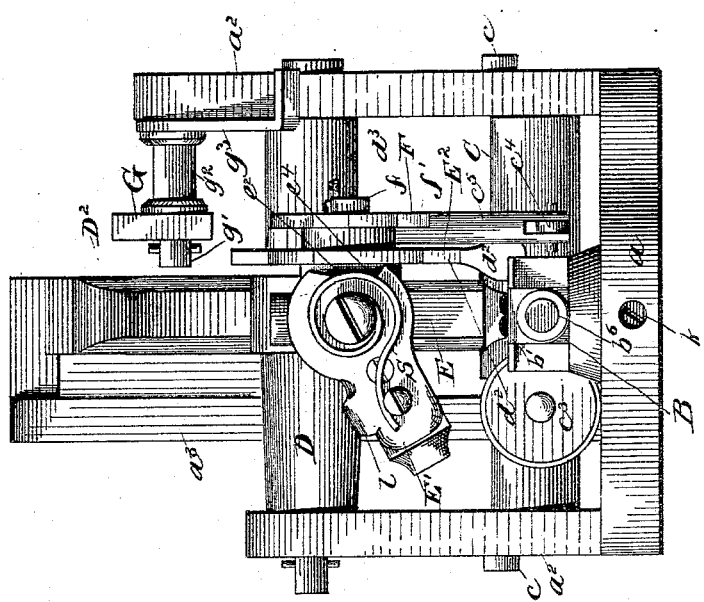
Attest:
W. H. H. Knight
Saml. H. Jacobson
Inventor:
Charles Erlanger
by Abraham and Mayer
attorneys (No Model.) 7 Sheets—Sheet 7.

C. ERLANGER.

BUTTON FASTENING MACHINE.

No. 325,516. Patented Sept. 1, 1885.

Attest:
W. H. H. Knight
Saml. H. Jacobson

Inventor:
Charles Erlanger
by Abraham and Mayer
attorneys

UNITED STATES PATENT OFFICE.

CHARLES ERLANGER, OF BALTIMORE, MARYLAND.

BUTTON-FASTENING MACHINE.

SPECIFICATION forming part of Letters Patent No. 325,516, dated September 1, 1885.

Application filed March 2, 1885. (No model.)

*To all whom it may concern:*

Be it known that I, CHARLES ERLANGER, a citizen of the United States, residing at Baltimore, and State of Maryland, have invented a new and useful Improvement in Button-Fastening Machines, of which the following is a specification.

My invention relates to button-fastening machines; and it consists in the construction, arrangement, and combination of the various parts, substantially as hereinafter described, and specifically pointed out in the claims.

My invention has for its object the provision of means for fastening buttons upon fabrics by metal staples by turning said staples over upon one face of the button-disk and bending or returning the staple-prongs over the opposite side, so as to form an embracing-loop; and my device is specially adapted for fastening buttons in the manner shown and described in my application for Letters Patent for button-fasteners dated March 2, 1885, Serial No. 157,548.

Figure 1:
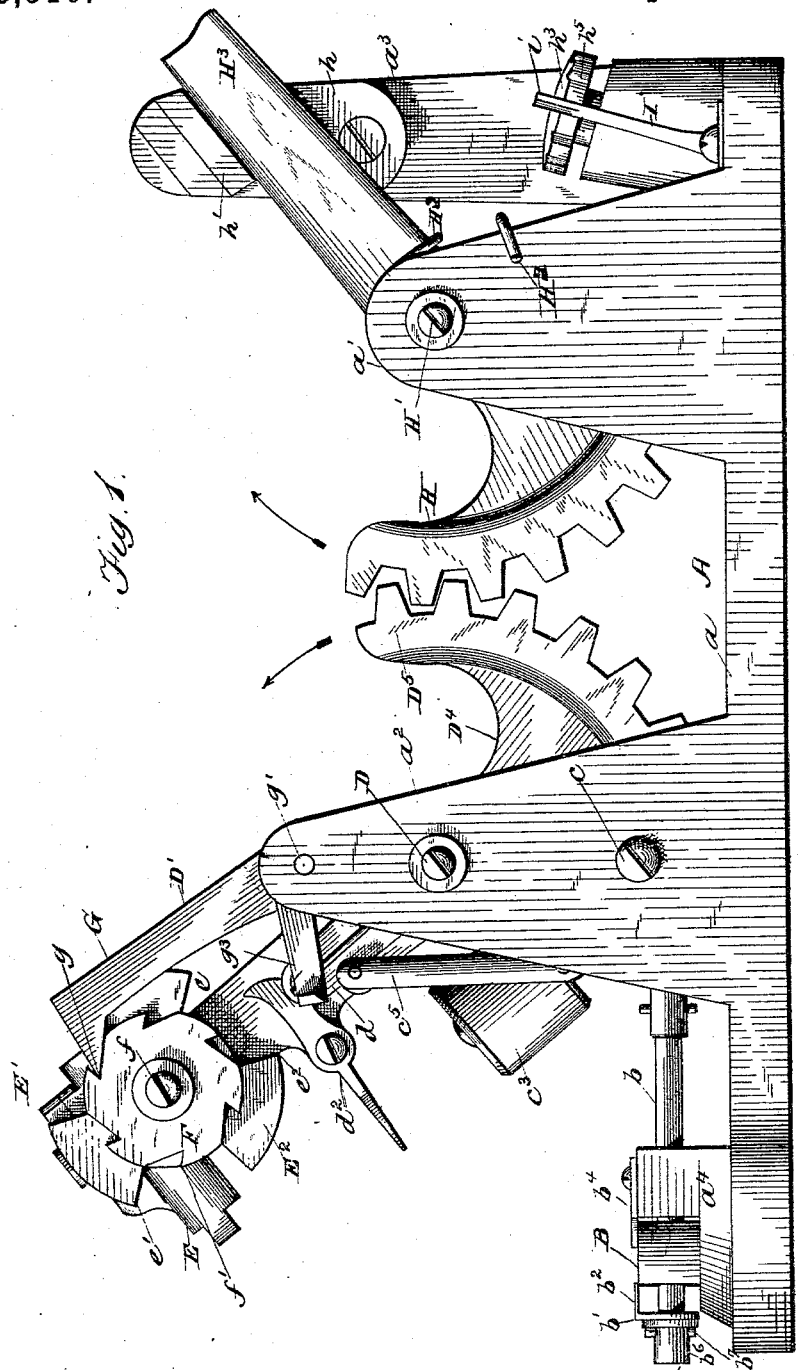
Figure 2:
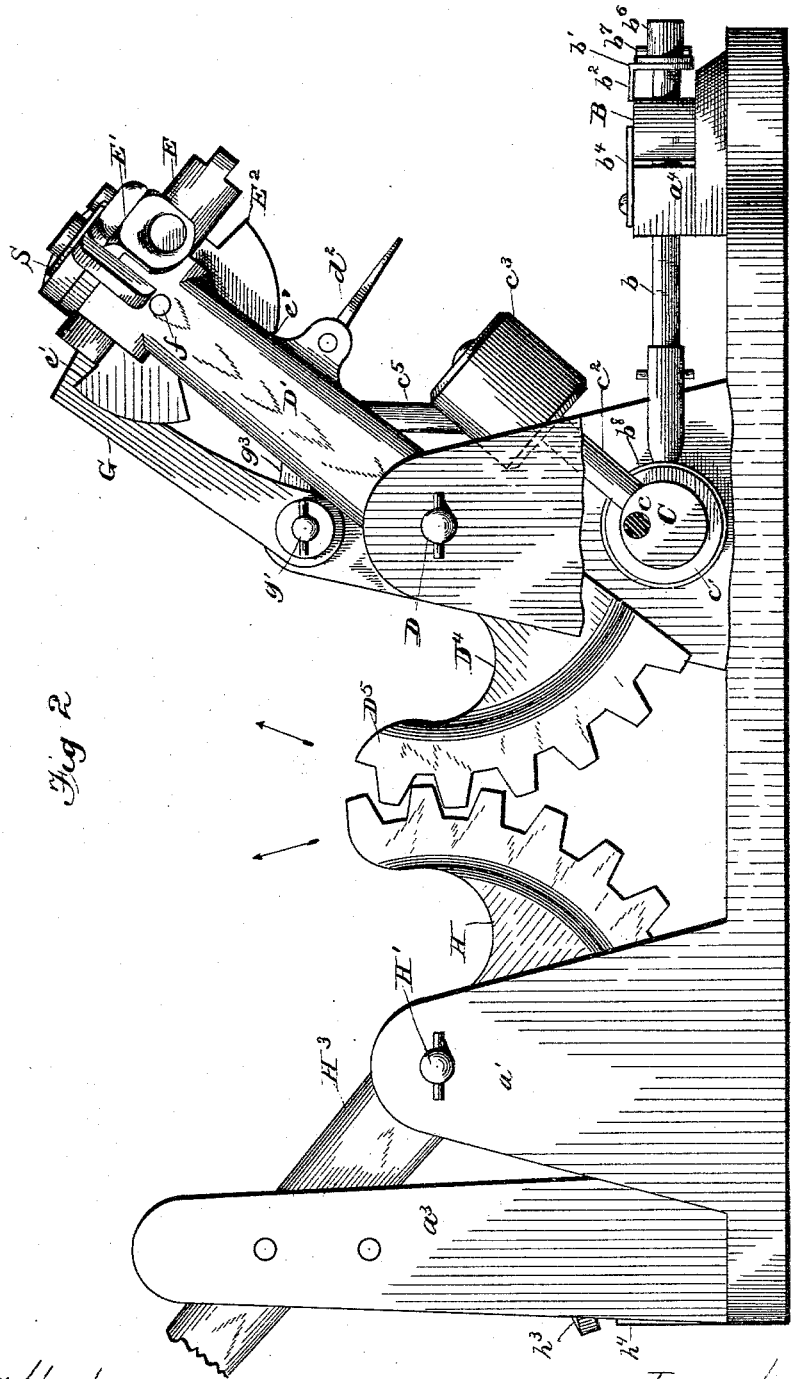
Figure 3:
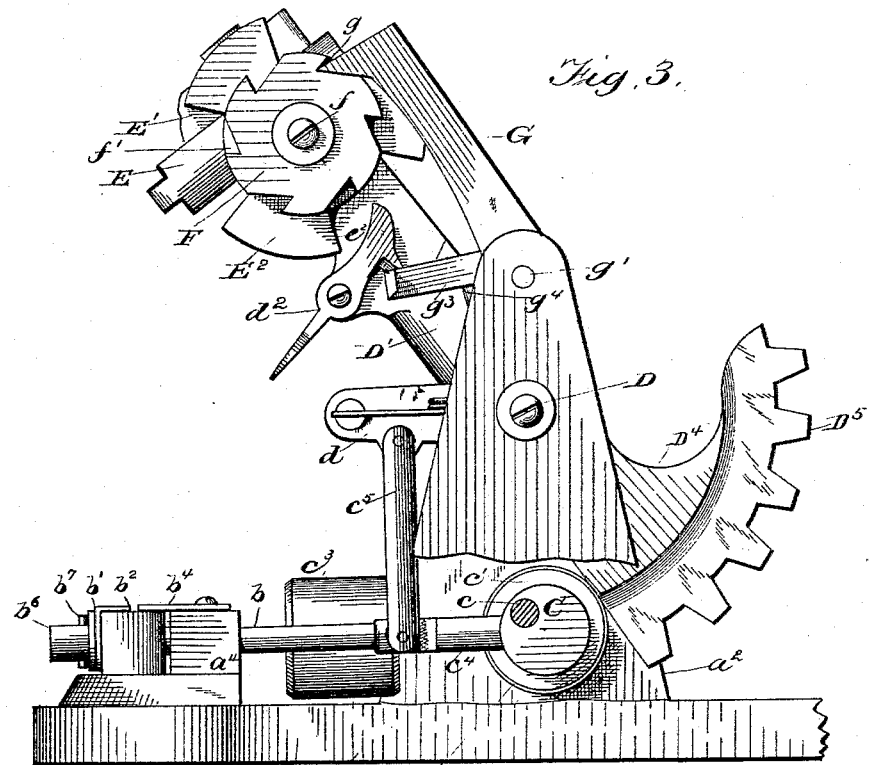
Figures 4, 5:
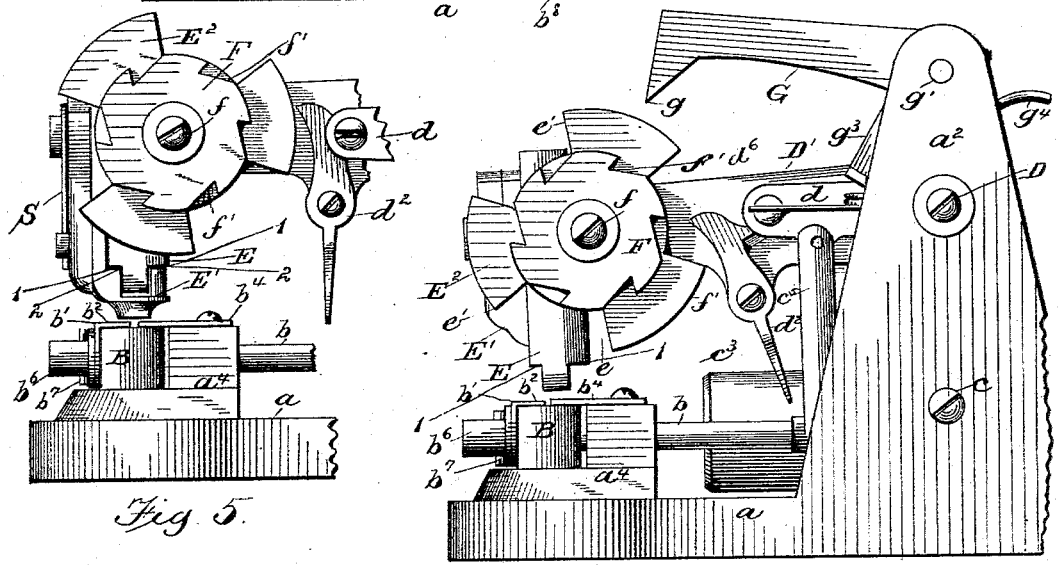
Figure 6:
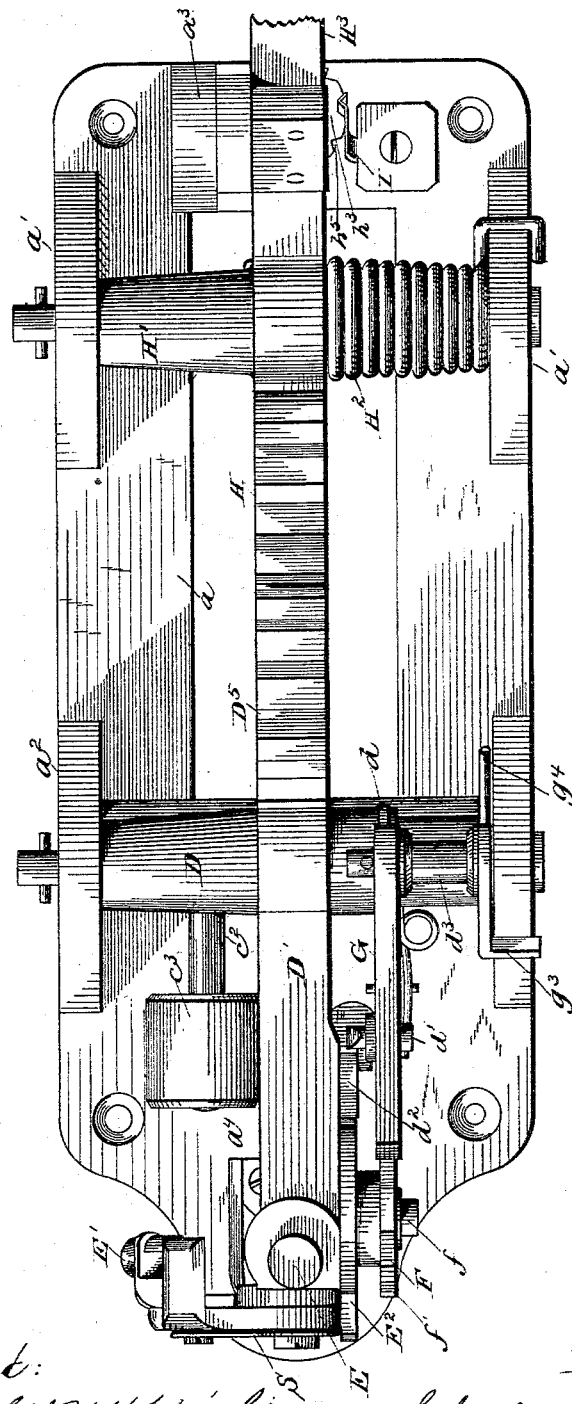
Figure 12:
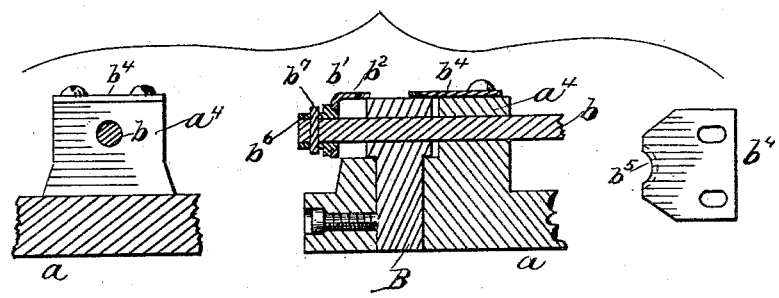
Figure 13:
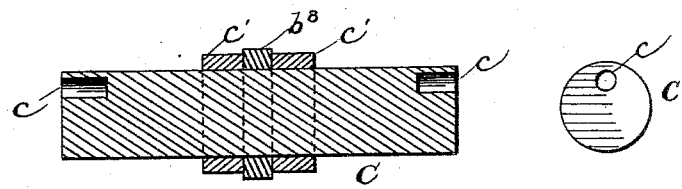
Figure 14:
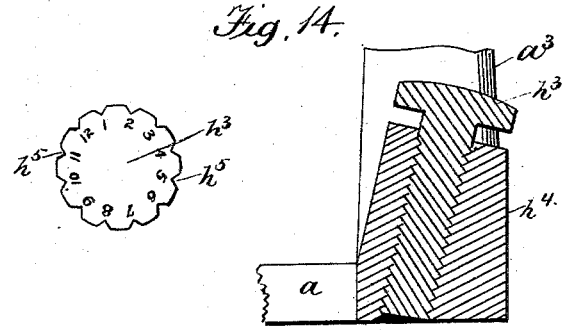

Referring to the accompanying drawings, in which like letters of reference point out similar parts on each figure, and in which Figure 1 represents a side elevation of my device in position to receive a button and fastener. Fig. 2 represents a similar view of the opposite side thereof. Fig. 3 represents a side elevation of the forward part of the machine, showing the position of the anvil-plates when a button is locked therein, the anvil parts of the forward standard being broken away. Fig. 4 is a similar view showing the hammer-head down and the inner die-stock resting down toward the anvil-plates. Fig. 5 is a similar view showing the hammer-head down, with its attached swinging die-stock in a perpendicular position over the die-stock shown in Fig. 4, the die-face of said swinging stock being in position for impinging on the button-staple. Fig. 6 is a top plan view of the machine in the position shown in Fig. 4. Fig. 7 is a plan view of the forward part as shown in Fig. 5. Fig. 8 is a top plan view of a portion of the frame, showing the anvil-plates open to receive a button. Fig. 9 is a similar top plan view showing the anvil angle-plate closed to grasp a button. Fig. 10 is a front view of parts in the position shown in Fig. 4. Fig. 11 is a front view of parts in the position shown in Fig. 5. Fig. 12 is a detail view of parts of the anvil and plate-locking device. Fig. 13 is a detail sectional view of the eccentrically-pivoted shaft for operating the anvil-plate. Fig. 14 is a detail of the rear limiting adjustable post and its operative mechanism.

In the drawings, A is the frame, consisting of a bed-plate, $a$, upwardly-projecting standards $a'$ $a^2$, and upright $a^3$. The bed-plate is further provided upon its forward end with an anvil-supporting block, $a^4$, provided with a seat for reception of the anvil B. The block $a^4$ is horizontally apertured for the passage of the connecting-rod $b$, which rod also passes through an aligning aperture made in the anvil B, and said rod is provided upon its forward end with an angle-plate, $b'$, the upper horizontal portion of which, $b^2$, is provided upon its rear edge with a semicircular cut-away portion, $b^3$, for the purpose of grasping the button in connection with a horizontal plate, $b^4$, affixed to the top of the block $a^4$, said plate $b^4$ having a cut-away portion, $b^5$, coincident with the cut-away part $b^3$ upon the angle-plate $b'$. The anvil is seated, as before described, within a recess of the block $a^4$, and is further secured in place by a key or screw, $k$, thus admitting changing of the anvil when desired for any purpose. The angle-plate $b'$ is rigidly attached to the front end of the rod $b$ in any desired manner. I show said plate connected to the rod $b$ by a boss, $b^6$, through which and the rod is a fastening-pin, $b^7$. The rear end of the rod $b$ is provided with a strap, $b^8$, which embraces a shaft, C, eccentrically pivoted at the points $c$ $c$ between and to the forward standards, $a^2$, near the lower ends thereof. The strap $b^8$ is held from lateral displacement by collars $c'$ $c'$, secured to the shaft C.

From the foregoing description it will be understood that the shaft C will, when partially rotated, turn within the strap $b^8$ and draw backward and forward the rod $b$ and its attachments. The shaft C is provided upon one end with a forwardly and upwardly projecting arm, $c^2$, carrying at its outer end a counter-weight, $c^3$, for a purpose hereinafter described. The opposite end of the shaft C is provided with a similar projecting arm, $c^4$, the outer end of which is connected by a link, $c^5$, to an arm, $d$, projecting from a sleeve, $d^3$, journaled on a shaft, D, to and between the forward standard, $a^2$, near their upper ends, said link $c^5$, arms $c^4$ and $d$ comprising a toggle-joint whereby to operate the shaft C when the device is actuated.

The outer end of the arm $d$ is provided with a lateral spring-pressed slip-pin, $d'$, to engage a dog, $d^2$, pivoted upon one side of an arm, D', connected to and projecting forwardly from the shaft D. The forward end of the arm D' forms a hammer-head, and is provided with a vertical aperture, into which the upper end of the inner die-stock, E, is secured. To the extreme forward outer end of the arm D' is pivoted the spring-pressed swinging die-stock E'. The die-stocks E E' are each provided with any suitable die-face.

The swinging or outer die-stock, E', is operated outwardly by a disk, $E^2$, having its periphery mutilated, notched, or cut away, as shown at $e$. When the disk E is rotated, the side surfaces, $e'$, will alternately engage with and release the swinging stock E', said stock being provided with a notched upper end, $e^2$, for that purpose. The swinging stock E', when operated as described, turns against a spring, S, fixed upon its forward outer face, which spring, when released from tension, operates to return said stock E' over and in alignment with the inner stock, E. Said stocks are so constructed that when the swinging stock E' is in the position last described its die-face shall be firmly supported by the inner die-stock—as, for instance, by means of meshing shoulders 1 2—by which firm resistance is provided without any risk of defacing the die-face of the inner stock, E. The swinging stock E', when over the inner stock, E, is prevented from passing beyond the perpendicular line by means of a stop lug, $l$, formed by a return of its outer face, which stop-lug, when the two die-stocks are in alignment, takes against the free side of the fixed stock E. (See Figs. 10 and 11.)

The disk $E^2$ is operated in the following manner, to wit: F represents a ratchet-wheel affixed to the outer face of disk $E^2$, said disk and ratchet-wheel having a common mounting, $f$. The teeth $f'$ of the ratchet-wheel engage with the toothed forward end, $g$, of a pawl, G, pivoted at its rear end to a stud, $g'$, projecting inwardly from the elongated upper end of one of the standards, $a^2$. The pawl G is provided with a laterally-projecting sleeve, $g^2$, encircling the stud $g'$, and having its opposite end supported with motion-limiting arms $g^3 g^4$, which bear respectively against the standard $a^2$ and the shaft D, which, as will be readily understood, control the movements of the pawl G. When the arm D' is swung downward in the position shown in Fig. 4, the pawl will be out of connection with the teeth of the ratchet-wheel F. When said arm D' is raised, the point or tooth of said pawl G will engage with one of the teeth of said ratchet-wheel, the further upward movement of the arm D' causing the wheel F to be partially rotated, and by said rotation the mutilated or notched disk $E^2$ will be caused to partially rotate, and thus release the point $e^4$ of the cut-away portion $e^2$ of the plate of the swinging stock E' from its engagement with the projecting tooth of the disk $E^2$, whereupon said swinging stock will be by the spring S, affixed to its face, swung downward and into the position shown in Figs. 5 and 11, in position for the final button-clamping operation, as will be hereinafter more particularly described.

By reference to Figs. 4 and 5 it will be seen that the dog $d^2$ is thrown by the periphery of the disk $E^2$ into a vertical position, its detaining-arm $d^6$ being passed below the inner end of the slip-pin $d'$ of the arm $d$, and the next upward movement of the arm D' will cause said arm $d$ to be raised, and thus, through the connecting-link $c^5$ and arm $c^4$, partially rotate the eccentric shaft C, and thereby unlock or throw apart the plates $b' b^4$ of the anvil-block, the space between said plates being for the reception of a button and its staple.

The alternate upward and downward motion of the arm D' is brought about in the following manner: $D^4$ represents a rearwardly-projecting arm extending from the shaft D and having its extreme rear end formed into a sector provided with gear-teeth $D^5$, that engage with similar gear-teeth formed upon a sector attached to an arm, H, projecting forward from a shaft, H', journaled to and between the rear standards, $a'$, near their upper ends. The shaft H' is provided upon one end with a torsion-spring, $H^2$, whereby the gear-toothed sectors are normally maintained in the position shown in Fig. 1. The shaft H' is provided with a rearwardly-extending arm, $H^3$, which arm may be provided, if desired, with a handle, whereby to operate the machine, or may be connected to a treadle or other power device. The upward movement of the arm $H^3$ is limited by a stop-plate, $h$, secured to or integral with the upright $a^3$, preferably cushioned, as shown at $h'$, while the downward movement is limited by an adjustable screw-threaded post, $h^3$, working within a corresponding screw-threaded casing, $h^4$, of the frame A. The head of the adjustable post is provided upon its periphery with a series of gage-notches, $h^5$, which are engaged by the upper point, $i$, of a vertical leaf-spring, I, secured to the frame A. The function of the post $h^3$ is to limit the downward movement of the handle $H^3$, and thereby control the distance between the die-faces and the anvil-plates to any predetermined degree.

My invention may be broadly described as consisting of a frame having uprising standards, to and between couples of which rotatable shafts are mounted, the rear shaft carrying an operative lever-arm, the upward movement of which is limited by a stop-lug, and the downward movement of which is limited by an adjustable limiting-post, the forward shaft carrying on a forwardly-extending arm a hammer-head provided with a fixed die-stock and swinging die-stock, with means for bringing said die-stocks into alignment, each shaft having, on a respective arm, gear-toothed sectors that, by meshing intermediately on the machine, bring the above two shafts into mutual operation, in combination with an eccentrically-pivoted shaft journaled between forward standards, said shaft carrying a counter-weight, and the means, substantially as described, for opening and closing gripping-plates upon an anvil, all as fully described and fully illustrated in the drawings.

Operation: The machine is shown at rest in Fig. 1. When in this position, a button, provided with its staple within its cable-holes, is placed upon the face of the anvil B and between the plates $b'$ $b^4$, and is locked between said plates by the release of the arm $d$ from connection with the dog $d^2$, which causes the counter-weight to fall into the position shown in Fig. 3, thereby partially rotating the eccentrically-pivoted shaft C, the effect being to propel the rod $b$ rearwardly, drawing with it the moving locking angle-plate $b'$ against the button, whereby said button is firmly gripped between the cut-away portions $b^3$ $b^5$, the button-staples (not shown) projecting upwardly. The inner stock, E, with its die-face, is now brought downward by the downward movement of the arm $H^3$, the face of said die impinging upon said staple and shaping it into position to be further pressed and turned. This position of the device is shown in Fig. 4. The arm D′, carrying the hammer-head with its die-stocks, is next raised by the upward movement of the arm $H^3$, and while being so raised the disk $E^2$ is partially rotated by the ratchet-wheel F and pawl G, as hereinbefore described, causing the swinging die-stock E′ to be swung downward over the inner die-stock and into the position shown in Fig. 5, for further acting upon the button-staple. The next downward movement of the arm $H^3$ will cause the arm D′ to be moved down, the die upon the stock E′ thus forcing the die-face of said stock into and against the button-staple, giving it its final turn or clinch. As before described, the dog $d^2$ will be thrown into engagement with the slip-pin $d'$ of the arm $d$, thus causing, through the link $c^5$ and arm $c^4$, the eccentrically-journaled shaft C to be partially rotated forward, thereby, through the rod $b$, opening the plates $b'$ $b^4$ and releasing the button therefrom, the upward movement of said arm D at the same time causing the die-stock E′ to be swung outward, and also raising the counter-weight $c^3$ into the position shown in Figs. 1, 2, and the whole device is ready for repetition of the above-described operation.

Having now fully described my invention and its operation, what I claim, and desire to secure by Letters Patent, is—

1. In a button-fastening device, a frame provided with an anvil and button-locking plates, in combination with fixed and swinging die-stocks mounted on the hammer-head of a forwardly-swinging arm, adapted to be successively brought upon said anvil for securing a button and its staple to fabric, substantially as described.

2. In a button-fastening device, a die-stock rigidly fixed to the outer and free end of a swinging arm, and provided upon its face with a swinging die-stock, substantially as described, said die-stocks adapted to be brought alternately into contact with an anvil by the successive downward and upward movement of said swinging arm, substantially as described.

3. In a button-securing device, a swinging arm extending from a rotatable shaft mounted on and between standards projecting from a frame, said arm provided, substantially as described, with a fixed and swinging die-stock, substantially as described.

4. In a button-securing device, a swinging arm extending from a rotatable shaft mounted on and between standards projecting from a frame, said arm provided with a fixed die-stock and swinging die-stock notched at the upper end of its face-plate, and having a disk with a mutilated periphery and a ratchet-wheel secured at its side, operated by a pawl adapted to bring said die-stocks into and out of alignment, as and for the purpose intended, substantially as described.

5. In a button-securing device, a disk having a mutilated periphery pivoted to the side of a swinging arm near its outer end, said disk provided upon its face with a ratchet-wheel, in combination with a pivoted pawl projecting from a standard and a swinging die-stock pivoted to the free end of said swinging arm and provided with an upper notch adapted to engage with the mutilated periphery of said disk, substantially as described.

6. In a button-fastening device, a swinging arm pivoted to and between forward standards projecting from a frame, said arm provided upon one end with die-stocks and operating ratchet-wheels and ratchets, substantially as described, and upon the other end with a gear-toothed sector, in combination with a similar gear-toothed sector projecting from a rotatable shaft mounted on and between rear standards, substantially as described.

7. In a button-fastening device, a swinging arm projecting from a rotatable shaft journaled to and between standards provided with die-stocks, ratchet-wheels, and a retaining-dog pivoted to said arm, in combination with a sleeved arm pivoted upon a shaft supporting the swinging arm, connecting-links, and an eccentrically-pivoted shaft for operating button clamping plates, substantially as described.

8. In a button-fastening device, a shaft eccentrically pivoted to and between standards and operating through a strap and connecting-rod, a movable clamping-plate, in combination with a sleeved arm mounted upon a suitably journaled rotatable shaft, said sleeved arm and eccentrically-pivoted shaft being connected by toggle-joint links, as and for the purpose intended, substantially as described.

9. In a button-fastening device, an anvil apertured for passage of a horizontally-propellible rod, said rod provided forwardly with an adjustable angle-plate having a cut-away portion on its horizontal face, in combination with a rearwardly-fixed plate having a similar cut-away portion, said plates comprising a gripping-clamp, substantially as described.

10. In a button-fastening device, an anvil-supporting block having a rearwardly-adjusted fixed clamping-plate and an anvil seated forwardly in said block, in combination with an adjustable or movable angle plate or clamp, as and for the purpose intended, substantially as described.

11. In a button-fastening device, an anvil-block permanently attached or integral with a bed-plate provided with a recessed seat for reception of an anvil, and a back portion apertured for passage of a movable rod, as and for the purpose intended, substantially as described.

12. In a button-fastening device, an anvil seated within a supporting-block, said block and anvil having aligning apertures for passage of a movable rod, in combination with button-gripping plates having similar cut-away portions upon their juxtaposited edges, one of said plates being permanently affixed to said block and the other attached to a horizontally-moving rod passing through said block and anvil, substantially as described.

13. In a button-fastening device, a swinging arm attached to a rotatable shaft provided at its free end with a fixed perpendicularly-depending die-stock and a spring-pressed pivoted swinging die-stock adapted to be sprung over and in alignment with the fixed die-stock, substantially as described.

14. In a button-fastening device, an eccentrically-pivoted shaft mounted to and between standards, said shaft provided with a forwardly-projecting arm pivoted by a connecting-link to an arm projecting forwardly from an upper rotatable shaft mounted to and between said standards, in combination with a forwardly-projecting arm on the eccentrically-pivoted shaft, said arm supplied with a counter-weight, as and for the purpose intended, substantially as described.

15. In a button-fastening device, an eccentrically-pivoted shaft mounted to and between standards and an upper rotatable shaft mounted to and between the same standards, each of said shafts having forwardly-projecting arms and being connected together by a pivoted link, said arms and link forming a toggle-joint whereby said shafts are simultaneously partially rotated, as and for the purpose intended, substantially as described.

16. In a button-fastening device, an eccentrically-pivoted shaft mounted to and between standards, said shaft having on one end a forwardly-extending arm, pivoted to a link, said link pivoted to an arm of an upper rotatable shaft, the eccentrically-pivoted shaft provided with a forwardly-projecting arm carrying a counter-weight, and at its middle portion being surrounded with a strap from which extends forwardly a horizontally-propellible rod by the propulsion of which end button-gripping devices are opened and closed, substantially as described.

17. In a button-fastening device, a rotatable shaft mounted to and between standards, provided with a forwardly-projecting arm carrying a hammer-head supplied with suitable die-stocks, said arm having pivoted thereto rearward of said hammer-head a dog, in combination with a spring-controlled slip-pin adjusted within an orifice within the free end of an arm extending from a loose sleeve upon one side of said shaft, said slip-pin adapted by rotation of said shaft to be brought into and out of engagement with said dog, as and for the purpose intended, substantially as described.

18. In a button-fastening device, a dog pivoted upon a forwardly-extending arm of a rotatable shaft mounted to and between standards, said shaft being provided at one side with a loose sleeve from which extends forwardly another arm provided with a spring-pressed slip-pin, in combination with a lower eccentrically-pivoted shaft mounted to and between the same standards, provided with a counter-weight side-arm and a horizontally-propellible rod, said eccentrically-pivoted shaft and side-extending arm being connected by toggle-jointed links, as and for the purpose intended, substantially as described.

19. In a button-fastening device, a swinging pawl pivoted upon a standard projecting from a frame of the machine, in combination with a ratchet-wheel and disk, having mutilated periphery and hammer-head provided with die-stocks, substantially as described.

20. In a button-fastening device, a swinging pawl pivoted upon a stud projecting from a standard, said pawl provided with movement-limiting arms, in combination with a ratchet-wheel disk having mutilated periphery and a swinging hammer-head provided with fixed and pivoted die-stocks, said pivoted die-stock having a notch at its upper end adapted to mesh with the mutilated periphery of the ratchet-wheel disk, substantially as described.

21. In a button-fastening device, a pawl provided with motion-limiting arms, extending from a loose sleeve surrounding a stud projecting from a fixed standard, a ratchet-wheel operated by said pawl, in combination with a swinging die-stock having an upper notch meshing with the mutilated periphery of a rotatable disk, and said disk, said die-stock pivotally connected to a swinging arm extending from a shaft journaled to and between standards of the frame of the machine, substantially as described.

22. In a button-fastening device, a pawl having movement-limiting arms, said pawl mounted upon a stud projecting from a standard and in the track of a ratchet-wheel and disk with mutilated periphery journaled to a swinging arm, whereby when said swinging arm is alternately raised or lowered the ratchet-wheel is rotated in step-by-step motion by engagement with said pawl, substantially as described.

23. In a button-fastening device, the combination, of an arm pivoted upon a shaft mounted to and between standards, said arm provided with a ratchet-wheel and disk having mutilated periphery adapted to alternately engage with and release the notched upper end of a swinging die-stock pivoted to said arm, with a pawl mounted upon a stud projecting laterally from a standard above and in the same plane of said shaft, whereby when said swinging arm is raised and its ratchet-wheel brought into connection with the pawl said ratchet-wheel will be rotated forwardly by the continued upper movement of the arm and consequent lessening of distance between the end of said arm and the end of the pawl, substantially as described.

24. In a button-fastening device, a disk having projecting portions upon its periphery, said portions being equal in dimensions to the intervening spaces, forming alternately open and delay spaces, whereby a spring-pressed pivoted die-stock is operated by its alternate connection with and release from the projections on said disk as the latter is rotated, substantially as described.

25. In a button-fastening device, and in combination with a spring-pressed die-stock having a cut-away notch at the upper part of its face-plate, pivoted to a swinging arm mounted to and between standards projecting from the frame, a disk having three equal-sized projecting portions extending from its periphery, and equally spaced apart, said disk provided upon its face with a ratchet-wheel, (the disk and wheel having a common mounting,) and a suitably-mounted pawl, whereby said disk is rotated and the spring-pressed die-stock swung to and fro, substantially as described.

26. A button-fastening device provided with a rigidly-adjusted die-stock, and a spring-pressed swinging die-stock, substantially as described, adapted to be brought into alignment upon a hammer-head by operative machinery, said stocks provided with interlocking shoulders and suitable stops to prevent perpendicular and lateral displacement when actuated and at the same time affording protection to the die-face of the fixed die-stock, substantially as described.

27. In a button-fastening device, a rotatable shaft journaled to and between standards projecting upwardly at the rear of the machine, said shaft provided with a rearwardly-extending lever-arm, whereby it is rotated, and having a torsion-spring wound round said shaft, whereby it is returned to its normal position when released from tension, said shaft having a forwardly-projecting swinging arm carrying a gear-toothed sector, in combination with the swinging arm projecting from a similar shaft mounted at the forward portion of the machine, having at its rear end a gear-toothed sector meshing with the sector on the opposite arm, its die-stocks and attachments, as and for the purpose intended, substantially as described.

28. In a button-fastening device, a screw-threaded adjusting-post mounted in a suitable casing projecting from a bed-plate, said post provided with a circular head or plate, the periphery of which is provided with a series of spaced detents or notches, in combination with an upwardly-projecting leaf-spring secured to the bed of the machine-frame, its upper end adapted to engage with the notched periphery of the post-head, thereby limiting the action of said lever-arm and its connections to any predetermined degree, substantially as described.

CHARLES ERLANGER.

Witnesses:
SAML. H. JACOBSON,
ANSON S. TAYLOR.